(12) United States Patent
Fukami

(10) Patent No.: US 9,488,887 B2
(45) Date of Patent: Nov. 8, 2016

(54) DISPLAY DEVICE

(71) Applicant: Panasonic Liquid Crystal Display Co., Ltd., Himeji-shi, Hyogo (JP)

(72) Inventor: Tetsuo Fukami, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 93 days.

(21) Appl. No.: 14/196,575

(22) Filed: Mar. 4, 2014

(65) Prior Publication Data

US 2015/0160523 A1 Jun. 11, 2015

(30) Foreign Application Priority Data

Dec. 5, 2013 (JP) .................................. 2013-252211

(51) Int. Cl.
  *G02F 1/1362* (2006.01)
(52) U.S. Cl.
  CPC ... *G02F 1/136204* (2013.01); *G02F 1/136286* (2013.01)
(58) Field of Classification Search
  CPC ............................................... G02F 1/136286
  See application file for complete search history.

(56) References Cited

U.S. PATENT DOCUMENTS

| | | | |
|---|---|---|---|
| 2008/0042963 A1* | 2/2008 | Fujita | 345/98 |
| 2008/0180627 A1* | 7/2008 | Yasuda et al. | 349/152 |
| 2011/0050553 A1* | 3/2011 | Takada et al. | 345/96 |
| 2012/0105392 A1* | 5/2012 | Nagami | G02F 1/1345 345/204 |
| 2012/0112199 A1* | 5/2012 | Son et al. | 257/72 |
| 2013/0050173 A1* | 2/2013 | Koo | 345/212 |
| 2013/0106811 A1 | 5/2013 | Hirabayashi | |

FOREIGN PATENT DOCUMENTS

| | | |
|---|---|---|
| JP | 2009-151325 | 7/2009 |
| JP | 2013-097052 | 5/2013 |

* cited by examiner

*Primary Examiner* — Paisley L Arendt
*Assistant Examiner* — Edmond Lau
(74) *Attorney, Agent, or Firm* — Hamre, Schumann, Mueller & Larson, P.C.

(57) ABSTRACT

On a first substrate for a display device, gate lines, data lines, pixel electrodes, a common electrode, thin film transistors, connection wirings that correspond to the data lines, respectively, and are connected to a data line driving circuit, protection circuits, and a control line connected to the protection circuits are formed. The data lines are electrically connected to the connection wirings via the protection circuits. The connection wirings are formed in the same layer as the gate lines. The control lines is formed of the same material as that of the common electrode, and then, receives a common voltage.

6 Claims, 17 Drawing Sheets

DISPLAY DEVICE

CROSS-REFERENCE TO RELATED APPLICATION

The present application claims priority from Japanese application JP2013-252211 filed on Dec. 5, 2013, the content of which is hereby incorporated by reference into this application.

TECHNICAL FIELD

The present invention relates to a display device.

BACKGROUND

In a liquid crystal display device, for example, among various kinds of display devices, an electric field generated between a pixel electrode formed in each of pixel areas and a common electrode is applied to a liquid crystal, thereby driving the liquid crystal so as to adjust the intensity of a light beam permeating a region defined between the pixel electrode and the common electrode, thus displaying an image. A thin film transistor is formed in the vicinity of an intersection between a gate line and a data line in each of the pixel areas.

In the field of the liquid crystal display device, there has been conventionally proposed a technique for preventing an electrostatic discharge damage to the thin film transistors caused by static electricity occurring inside of a display panel.

Japanese Patent Application Laid-open No. 2009-151325, for example, discloses a display device in which protection circuits for gate lines are disposed inside of a gate line driving circuit whereas protection circuits for data lines are disposed inside of a data line driving circuit.

SUMMARY

However, in the configuration disclosed in Japanese Patent Application Laid-open No. 2009-151325, the circuit area of the driving circuit becomes large, thereby making it difficult to narrow a frame in the liquid crystal display device. Moreover, in a very small-sized and highly definition display device for a smart phone or a tablet device, an interval between wirings wired in a frame region (i.e., a wiring pitch) becomes narrow, and therefore, the plurality of wirings constituting a protection circuit are brought into contact with each other, thus possibly degrading the function of the protection circuit.

The present invention has been accomplished in view of the above-described circumstances. Therefore, an object of the present invention is to provide a display device capable of preventing an electrostatic discharge damage to a thin film transistor, and further, narrowing a frame.

In order to solve the above-described problems, a display device in one embodiment of the present invention includes: a first substrate on a back side; and a second substrate on a display screen side, the first substrate and the second substrate being disposed opposite to each other, the first substrate comprising: a plurality of gate lines, each of which extends in a column row direction; a plurality of data lines, each of which extends in a row column direction; a plurality of pixel electrodes arranged in a manner corresponding to a plurality of pixels arrayed in the column and row directions; a common electrode disposed opposite to the plurality of pixel electrodes, for supplying a common voltage; a plurality of thin film transistors arranged in the vicinity of intersections between the plurality of data lines and the plurality of gate lines; a plurality of connection wirings that correspond to the plurality of data lines and are connected to a data line driving circuit; a plurality of protection circuits that correspond to the plurality of data lines, respectively, and are adapted to protect the plurality of thin film transistors; and a control line connected to the plurality of protection circuits, in which the plurality of data lines being electrically connected to the plurality of connection wirings via the plurality of protection circuits, respectively; the plurality of connection wirings being formed in the same layer as the plurality of gate lines; and the control line being formed of the same material as that of the common electrode and receiving the common voltage.

In the display device in one embodiment of the present invention, each of the plurality of protection circuits may include first and second thin film transistors of a diode connection type; in the first thin film transistor, a gate electrode is connected to the data line and the connection wiring, a drain electrode is connected to the data line and the connection wiring, and a source electrode is connected to the control line; and in the second thin film transistor, a gate electrode is connected to the control line, a drain electrode is connected to the control line, and a source electrode is connected to the data line and the connection wiring.

In the display device in one embodiment of the present invention, the control line may be commonly provided in the first thin film transistor and the second thin film transistor in each of the plurality of protection circuits.

The display device in one embodiment of the present invention may further include a common voltage generating circuit for supplying the common voltage to the common electrode, the control line being electrically connected to the common voltage generating circuit.

In the display device in one embodiment of the present invention, the plurality of protection circuits may be arranged in a zigzag fashion outside of an image display area, as viewed on the plane.

In the display device in one embodiment of the present invention, the plurality of data lines and the plurality of connection wirings that are formed on layers different from each other may be electrically connected via a metal film forming a contact hole.

In the display device in one embodiment of the present invention, in the first substrate, a metal wiring constituting the gate line, the gate electrode for the first thin film transistor, and the gate electrode for the second thin film transistor may be formed on a glass substrate; a first insulating film may be formed in such a manner as to cover the metal wiring; a semiconductor layer may be formed on the first insulating film; the data line and a drawing wiring drawn from the data line may be formed on the semiconductor layer; a second insulating film may be formed in such a manner as to cover the data line and the drawing wiring; the control line and the common electrode may be formed on the second insulating film; a third insulating film may be formed in such a manner as to cover the control line and the common electrode; and the pixel electrode may be formed on the third insulating film.

In the display device in one embodiment of the present invention, in the third insulating film may be formed a first contact hole reaching the control line; in the first insulating film, the second insulating film, and the third insulating film may be formed a second contact hole reaching the metal wiring constituting the gate electrode for the second thin film transistor; and a metal film continuous to the inside of the first and second contact holes may be formed, the control line and the metal wiring being electrically connected to each other via the metal film.

In the display device in one embodiment of the present invention, the width of the semiconductor layer may be greater than that of the data line and that of the drawing wiring.

DETAILED DESCRIPTION

Preferred embodiments according to the present invention will be described below with reference to the attached drawings. Although the preferred embodiments below exemplify a liquid crystal display device, a display device according to the present invention is not limited to this, and therefore, it may be an organic EL display device and the like.

Figure 1:
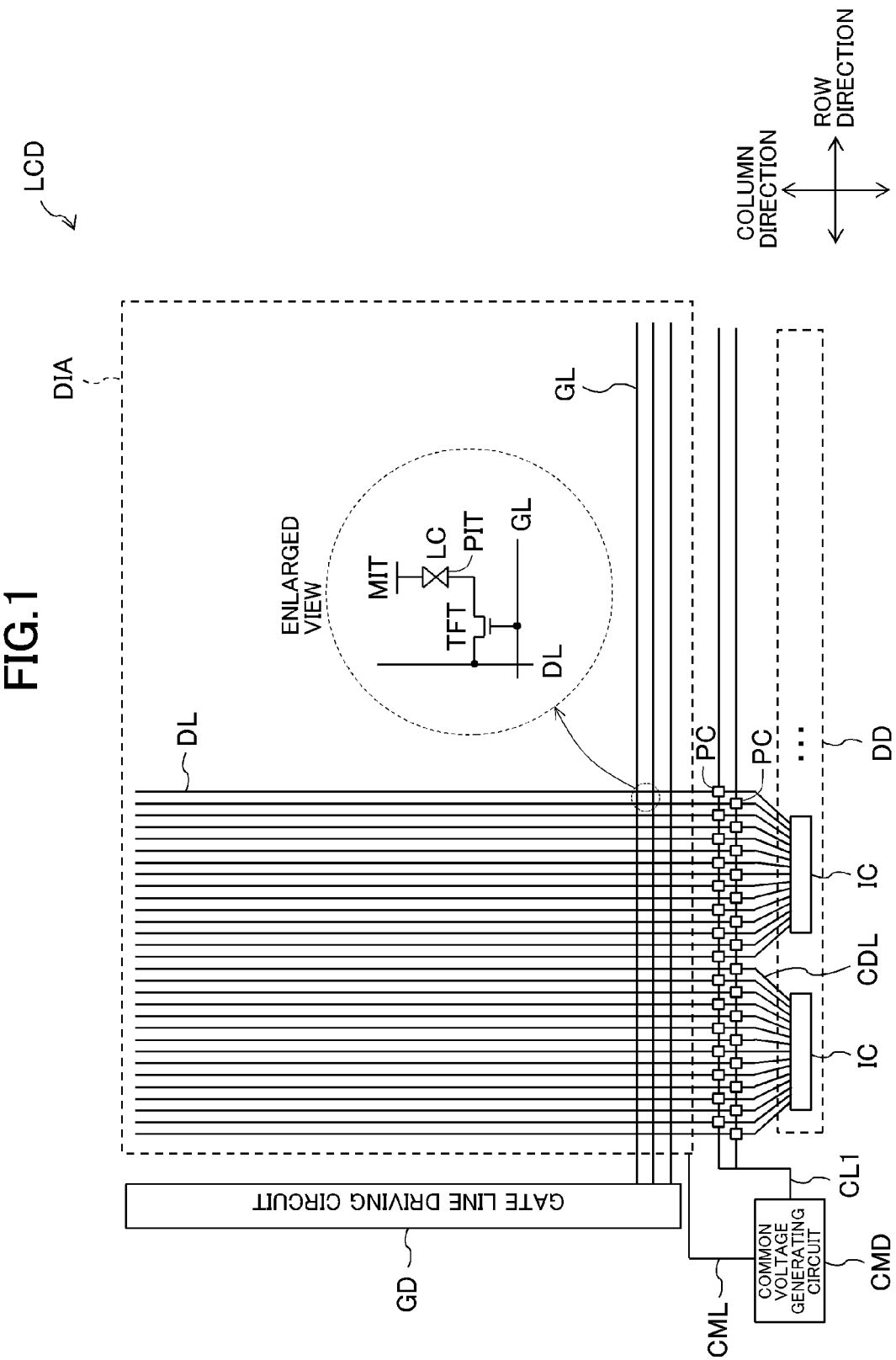
FIG. 1 is a diagram illustrating the entire configuration of a liquid crystal display device in a preferred embodiment according to the present invention.

FIG. 1 is a diagram illustrating the entire configuration of a liquid crystal display device in a preferred embodiment according to the present invention. A liquid crystal display device LCD includes an image display area DIA and a frame region surrounding the image display area DIA. A plurality of pixel areas, each of which is defined by adjacent two gate lines GL and adjacent two data lines DL, are arranged in a column direction and a row direction in a matrix fashion in the image display area DIA. Here, the row direction represents a direction in which the gate line GL extends whereas the column direction represents a direction in which the data line DL extends.

In each of the pixel areas, a pixel electrode PIT and a common electrode MIT are formed. Moreover, a thin film transistor TFT is formed in the vicinity of the intersection between the gate line GL and the data line DL in each of the pixel areas. The pixel electrode PIT is electrically connected to the data line DL via the thin film transistor TFT. The common electrode MIT is solidly formed over the entire image display area DIA. Incidentally, the common electrode MIT may have an opening (i.e., a slit) corresponding to each of the pixel areas, may be formed in a stripe fashion per one or more pixel columns or pixel rows, or may be separately formed in each of the pixel areas.

In the frame region, a data line driving circuit DD, a gate line driving circuit GD, a common voltage generating circuit CMD, protection circuits PC, a control circuit (not shown), and wirings connected to these circuits are disposed.

Figure 2:
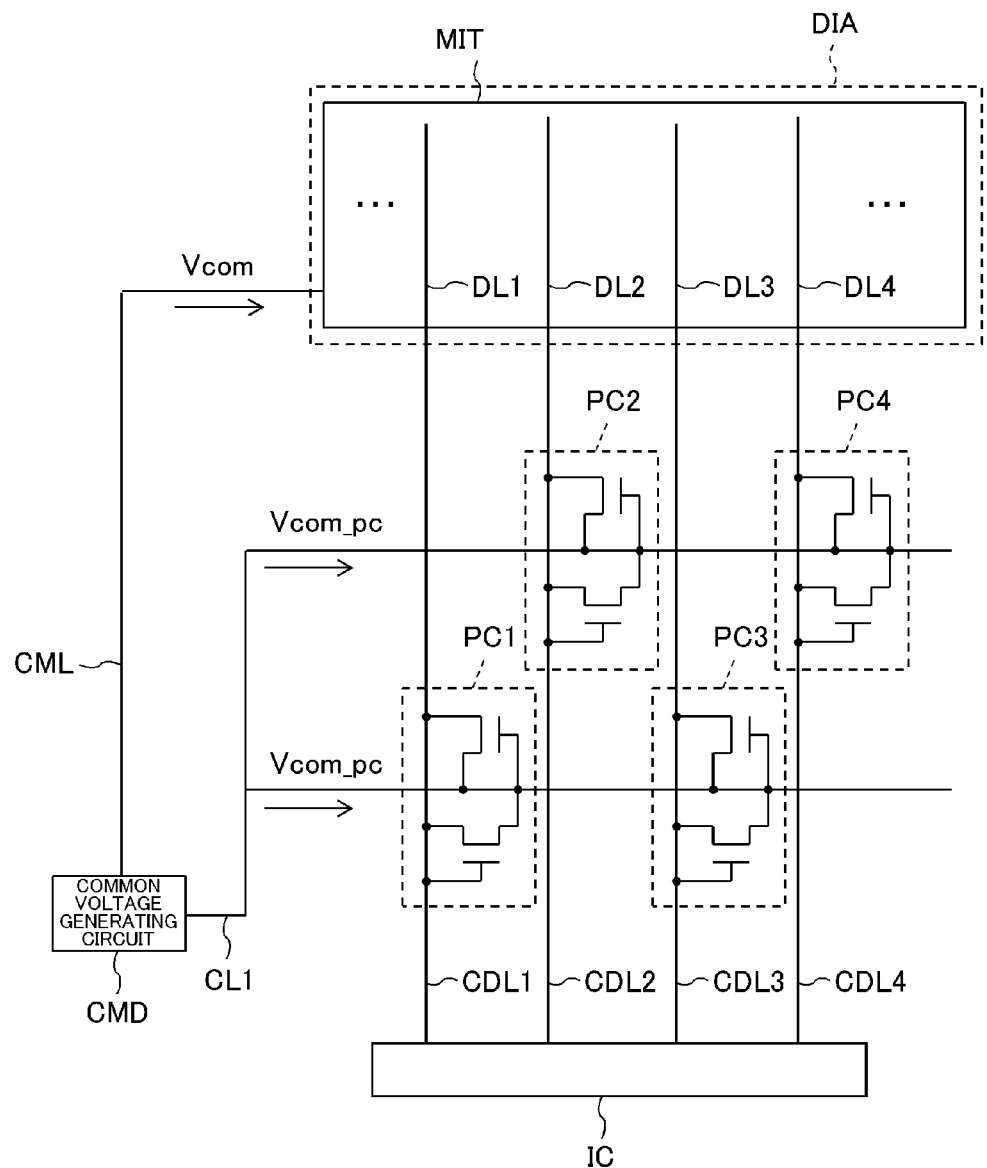
FIG. 2 is a diagram illustrating the connection relationship between protection circuits and a data driver IC.

The data line driving circuit DD includes a plurality of data drivers IC, the plurality of data lines DL are electrically connected to each of the plurality of data drivers IC, respectively. Specifically, one end of a connection wiring CDL is connected to an output terminal of the data driver IC. The other end of the connection wiring CDL is connected to the protection circuit PC. One end of the data line DL is connected to the protection circuit PC. The connection wiring CDL and the data line DL are electrically connected to each other inside of the protection circuit PC via the protection circuit PC. One protection circuit PC is disposed for one data line DL. FIG. 2 is a diagram illustrating the connection relationship between the protection circuits PC and the data driver IC. FIG. 2 illustrates a section corresponding to arbitrary adjacent four data lines DL1 to DL4. For example, a protection circuit PC1 is provided for a connection wiring CDL1 and the data line DL1, and further, a protection circuit PC2 is provided for a connection wiring CDL2 and the data line DL2.

To the common voltage generating circuit CMD, a common wiring CML for supplying a common voltage (Vcom) to the common electrode MIT and a control line CL1 for supplying a constant voltage (Vcom_pc in FIG. 2) to each of the protection circuits PC are connected. The control line CL1 extends in the row direction, as viewed on the plane, in such a manner as to be perpendicular to the data line DL. The common voltage generating circuit CMD is adapted to supply the same voltage (Vcom) to the common wiring CML and the control line CL1.

Figure 3:
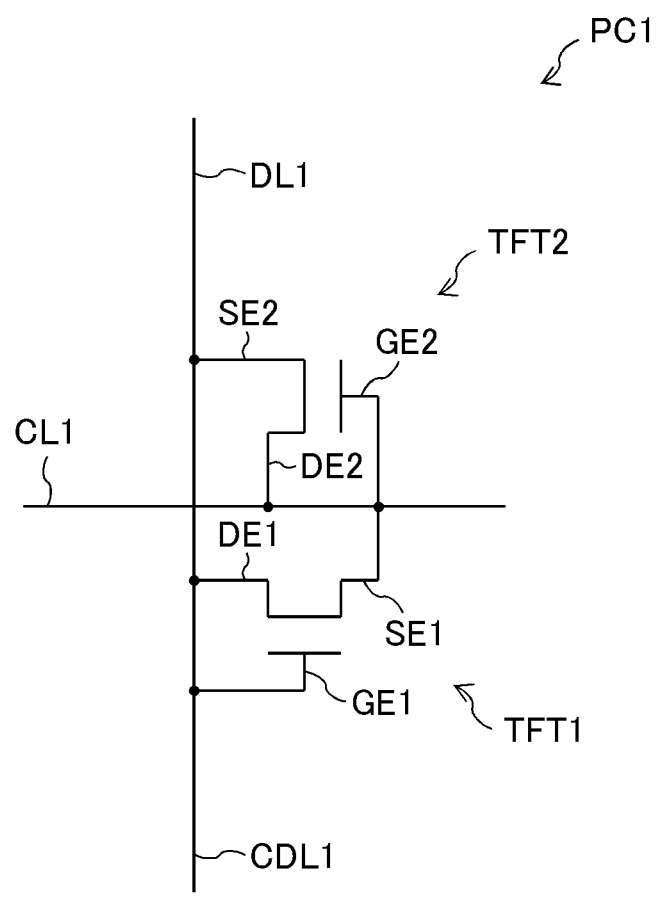
FIG. 3 is a circuit diagram illustrating the specific configuration of the protection circuit.

Here, a description will be given of the specific configuration of the protection circuit PC. FIG. 3 is a circuit diagram illustrating the specific configuration of the protection circuit PC. The protection circuits PC have the same configuration as each other. FIG. 3 illustrates one protection circuit PC1. The protection circuit PC1 includes two thin film transistors TFT1 and TFT2 of a diode connection type. In the thin film transistor TFT1 (i.e., a first thin film transistor), a gate electrode GE1 is connected to the data line DL1 and the connection wiring CDL1; a drain electrode DE1 is connected to the data line DL1 and the connection wiring CDL1; and a source electrode SE1 is connected to the control line CL1. In contrast, in the thin film transistor TFT2 (i.e., a second thin film transistor), a gate electrode GE2 is connected to the control line CL1; a drain electrode DE2 is connected to the control line CL1; and a source electrode SE2 is connected to the data line DL1 and the connection wiring CDL1. The source electrode SE1 of the thin film transistor TFT1, the gate electrode GE2 of the thin film transistor TFT2, and the drain electrode DE2 of the thin film transistor TFT2 are electrically connected to each other, and further, are electrically connected to the control line CL1.

With the above-described configuration of the protection circuit PC, for example, when the data line DL1 has a high potential, the thin film transistor TFT1 is turned on whereas the thin film transistor TFT2 is turned off. And then, the data line DL1 and the control line CL1 are electrically conducted to each other, thereby reducing the potential of the data line DL1 to approach the potential of the control line CL1 (Vcom). In contrast, when the data line DL1 has a low potential, the thin film transistor TFT2 is turned on whereas the thin film transistor TFT1 is turned off. And then, the data line DL1 and the control line CL1 are electrically conducted to each other, thereby increasing the potential of the data line DL1 to approach the potential of the control line CL1 (Vcom). In this manner, the data line DL1 whose potential is fluctuated due to static electricity or the like is settled to the potential of the control line CL1 (Vcom), thus preventing the electrostatic discharge damage to the thin film transistor TFT inside of the pixel area.

As illustrated in FIG. 2, the protection circuits PC are arranged in a zigzag fashion, and further, the control line CL1 is branched into two. This arrangement is applicable to a highly definition panel having a narrow wiring pitch between the data lines DL. Here, the arrangement of the protection circuits PC is not limited to this. For example, all of the protection circuits PC may be aligned in the row direction, and further, may be connected to a single control line CL.

The gate line driving circuit GD includes a plurality of gate drivers IC, and the plurality of gate lines GL are connected to each of the gate drivers IC, respectively.

Figure 4:
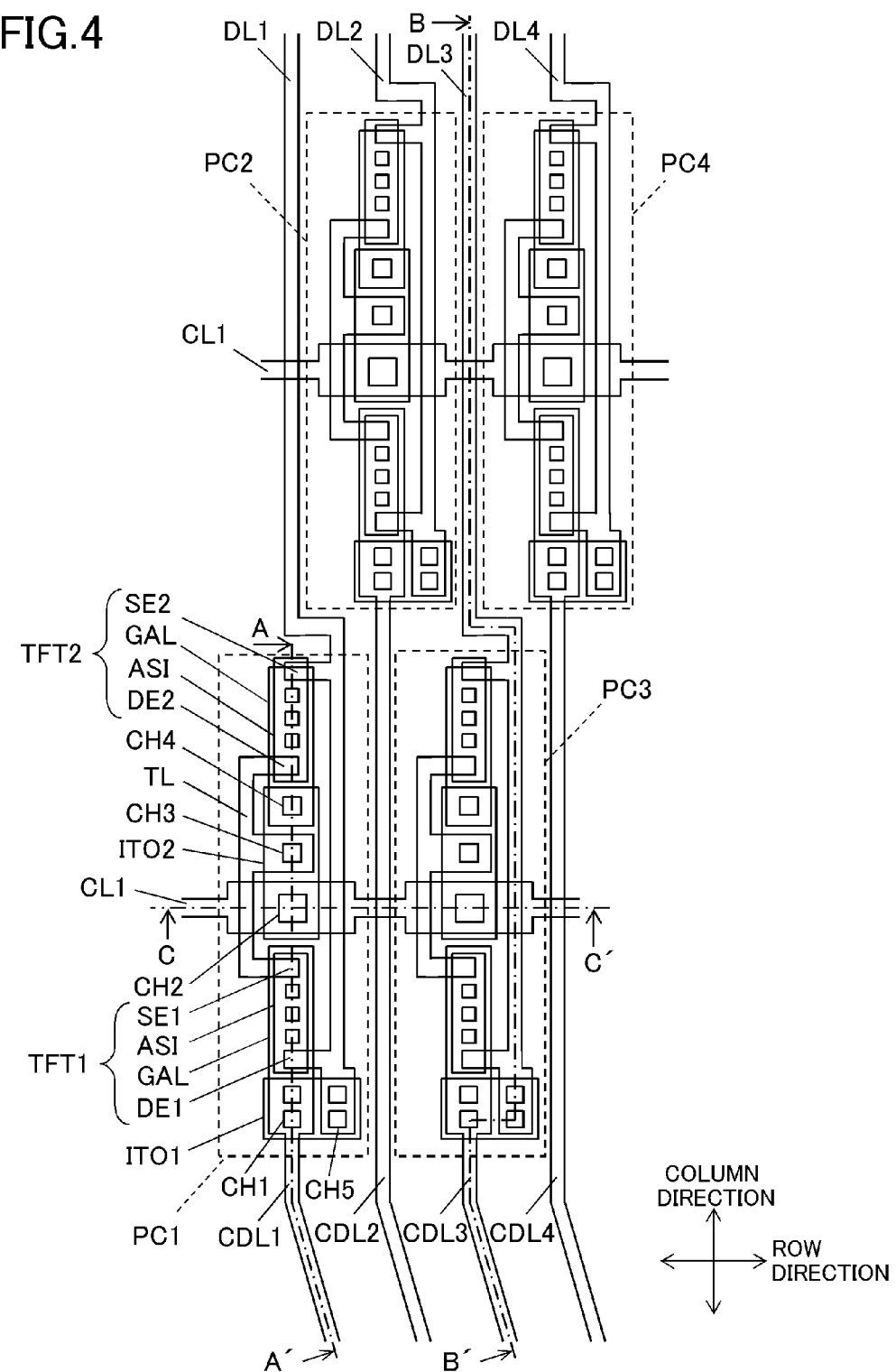
FIG. 4 is a plan view illustrating the connection relationship between wirings inside of the protection circuits.

FIG. 4 is a plan view illustrating the connection relationship between wirings inside of the protection circuits PC. FIG. 4 schematically shows the wirings, as viewed on the plane. The following description picks up the protection circuit PC1 as an example.

The connection wiring CDL1 slantwise extends near the data driver IC, and then, extends in the column direction near the protection circuit PC1. The connection wiring CDL1 is electrically connected to the data line DL1 via a metal film ITO1 formed in contact holes CH1 and CH5 inside of the protection circuit PC1.

In a region in which the thin film transistor TFT1 is formed, a semiconductor layer ASI made of amorphous silicon (aSi) is laminated on a metal wiring GAL (inclusive of the gate electrode GE1) constituting the connection wiring CDL1. Moreover, a drawing wiring DE1 (i.e., the drain electrode DE1) drawn from the data line DL1 is laminated on the semiconductor layer ASI. Additionally, drawing wiring SE1 (i.e., the source electrode SE1) drawn from a relay wiring TL is laminated on the semiconductor layer ASI. The relay wiring TL is electrically connected to the control line CL1 via a metal film ITO2 formed in contact holes CH2 and CH3.

In the meantime, in a region in which the thin film transistor TFT2 is formed, a semiconductor layer ASI is laminated on a metal wiring GAL. A drawing wiring SE2 (i.e., the source electrode SE2) drawn from the data line DL1 is laminated on the semiconductor layer ASI. Moreover, drawing wiring DE2 (i.e., the drain electrode DE2) drawn from the relay wiring TL is laminated on the semiconductor layer ASI. Additionally, the metal wiring GAL (inclusive of the gate electrode GE2) is electrically connected to the control line CL1 via the metal film ITO2 formed in a contact hole CH4.

Figure 5:
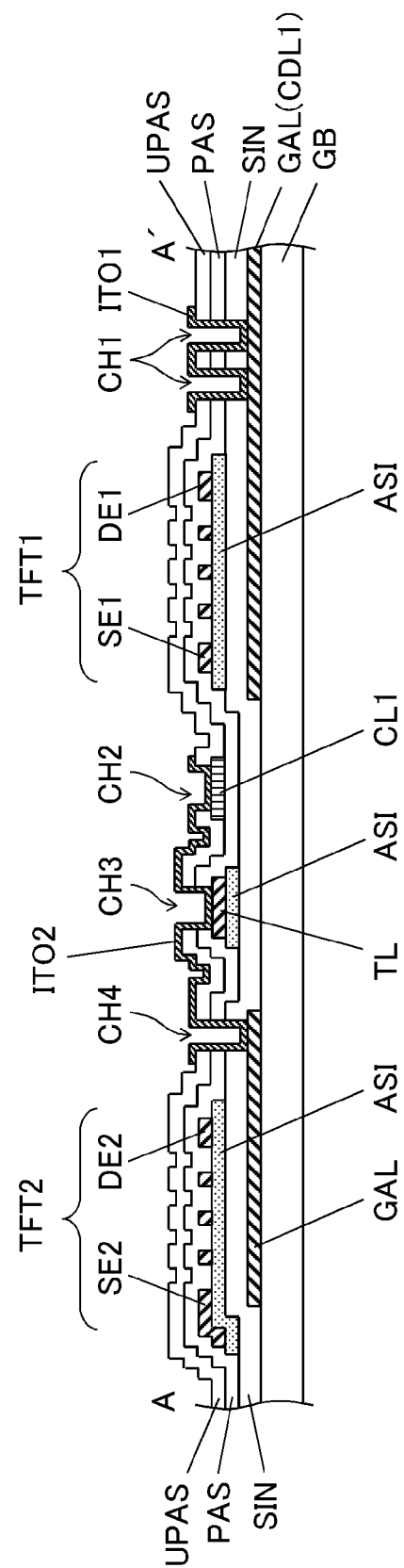
FIG. 5 is a cross-sectional view taken along a line A-A of FIG. 4.

A cross-sectional configuration in a section A-A of FIG. 4 will be described with reference to FIG. 5. FIG. 5 is a cross-sectional view taken along a line A-A of FIG. 4.

On a glass substrate GB, the metal wiring GAL is formed. The metal wiring GAL constitutes the connection wiring CDL1 and each of the respective gate electrodes GE1 and GE2 of the thin film transistors TFT1 and TFT2. An insulating film SIN (i.e., a first insulating film) is formed in such a manner as to cover the metal wiring GAL. On the insulating film SIN, the semiconductor layer ASI is formed. The semiconductor layer ASI is formed over the formation region of each of the thin film transistors TFT1 and TFT2 and the formation region of the relay wiring IL. The drawing wiring DE1 (i.e., the drain electrode DE1) drawn from the data line DL1, the drawing wiring SE1 (i.e., the source electrode SE1) drawn from the relay wiring TL, and three island portions interposed between these drawing wirings DE1 and SE1 are formed on the semiconductor layer ASI in the formation region of the thin film transistor TFT1. Here, the number of island portions may be three or more or less.

In contrast, the drawing wiring SE2 (i.e., the source electrode SE2) drawn from the data line DL1, the drawing wiring DE2 (i.e., the drain electrode DE2) drawn from the relay wiring TL, and three island portions interposed between these drawing wirings SE2 and DE2 are formed on the semiconductor layer ASI in the formation region of the thin film transistor TFT2. Here, the number of island portions may be three or more or less. A part of the relay wiring TL is formed on the semiconductor layer ASI in a region between the thin film transistors TFT1 and TFT2. The Data line DL, the relay wiring TL, and each of the drawing wirings may be made of the same material.

Incidentally, the thin film transistors TFT1 and TFT2 are formed by halftone exposing, described later. Therefore, the profile of the semiconductor layer ASI is larger than those of the relay wiring TL, the source electrode, and the drain electrode.

An insulating film PAS (i.e., a second insulating film) is formed in such a manner as to cover the relay wiring TL and each of the drawings wirings DE1, SE1, DE2, and SE2. On the insulating film PAS, the control line CL1 made of a metallic material is formed. An insulating film UPAS (i.e., a third insulating film) is formed in such a manner as to cover the control line CL1. The contact hole CH1 is formed on the insulating films SIN, PAS, and UPAS, and further, the metal film ITO1 is formed inside of the contact hole CH1. The contact hole CH1 is formed by boring each of the insulating films SIN, PAS, and UPAS by etching, followed by forming the metal film ITO1 thereon. Moreover, the contact hole CH2 (i.e., the first contact hole) is formed on the insulating film UPAS; the contact hole CH3 is formed on the insulating films PAS and UPAS; and the contact hole CH4 (i.e., the second contact hole) is formed on each of the insulating films SIN, PAS, and UPAS. Here, the metal film ITO2 is formed inside of each of the contact holes CH2, CH3, and CH4. The contact hole CH2 is formed by boring the insulating film UPAS by etching, followed by forming the metal film ITO2 thereon. The contact hole CH3 is formed by boring each of the insulating films PAS and UPAS by etching, followed by forming the metal film ITO2 thereon. The contact hole CH4 is formed by boring each of the insulating films SIN, PAS, and UPAS by etching, followed by forming the metal film ITO2 thereon. Additionally, the contact holes CH2, CH3, and CH4 are electrically connected to each other via the metal film 1102. In this manner, the control line CL1 and the metal wiring GAL (inclusive of the gate electrode GE2) constituting the thin film transistor TFT2 are electrically connected to each other. In addition, the control line CL1 and the drawing wiring SE1 (i.e., the source electrode SE1) drawn from the relay wiring TL constituting the thin film transistor TFT1 are electrically connected to each other.

Figure 6:
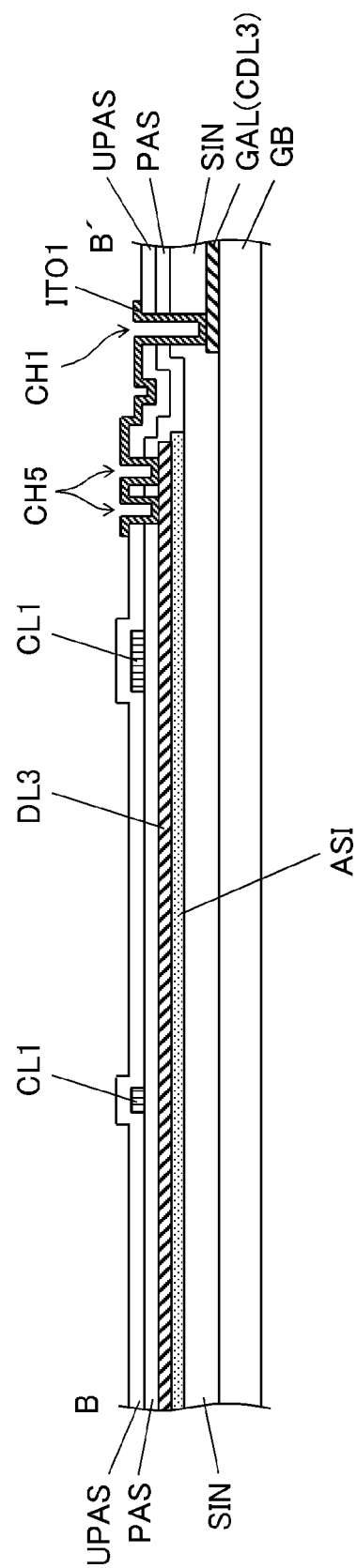
FIG. 6 is a cross-sectional view taken along a line B-B of FIG. 4.

A cross-sectional configuration in a section B-B of FIG. 4 will be described with reference to FIG. 6. FIG. 6 is a cross-sectional view taken along a line B-B of FIG. 4. Here, FIG. 6 illustrates the cross-sectional configuration of the protection circuit PC3 for the sake of convenience.

On the glass substrate GB, the metal wiring GAL is formed. The metal wiring GAL constitutes the connection wiring CDL3, like the connection wiring CDL1 illustrated in FIG. 5. The insulating film SIN is formed in such a manner as to cover the metal wiring GAL. The semiconductor layer ASI is formed on the insulating film SIN, and the data line DL3 is formed on the semiconductor layer ASI. The insulating film PAS is formed in such a manner as to cover the data line DL3. The control line CL1 is formed on the insulating film PAS. The insulating film UPAS is formed in such a manner as to cover the control line CL1. As illustrated in FIG. 5, the contact hole CH1 is formed on the insulating films SIN, PAS, and UPAS. The contact hole CH5 is formed on the insulating films PAS and UPAS. The metal film ITO1 is formed inside of each of the contact holes CH1 and CH5. The contact holes CH1 and CH5 are electrically connected to each other via the metal film ITO1. In this manner, the connection wiring CDL3 and the data line DL3 are electrically connected to each other.

Figure 7:
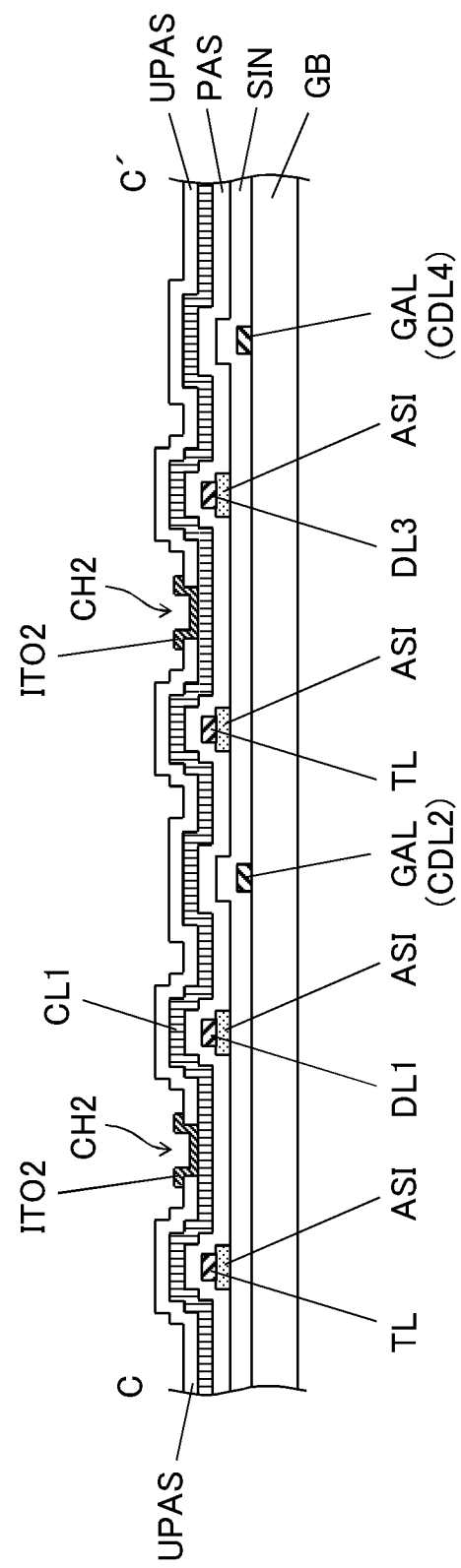
FIG. 7 is a cross-sectional view taken along a line C-C of FIG. 4.

A cross-sectional configuration in a section C-C of FIG. 4 will be described with reference to FIG. 7. FIG. 7 is a cross-sectional view taken along a line C-C of FIG. 4.

On the glass substrate GB, the metal wiring GAL is formed. The metal wiring GAL constitutes the connection wirings CDL2 and CDL4. The insulating film SIN is formed in such a manner as to cover the metal wiring GAL. The semiconductor layers ASI are formed on the insulating film SIN, and each of the relay wirings TL and the data lines DL1 and DL3 are formed on the semiconductor layers ASI. The insulating film PAS is formed in such a manner as to cover each of the relay wirings TL and the data lines DL1 and DL3. On the insulating film PAS, the control line CL1 is formed. The insulating film UPAS is formed in such a manner as to cover the control line CL1. The contact holes CH2 are formed on the insulating film UPAS. The metal films ITO2 are formed inside of each of the contact holes CH2.

Figure 8:
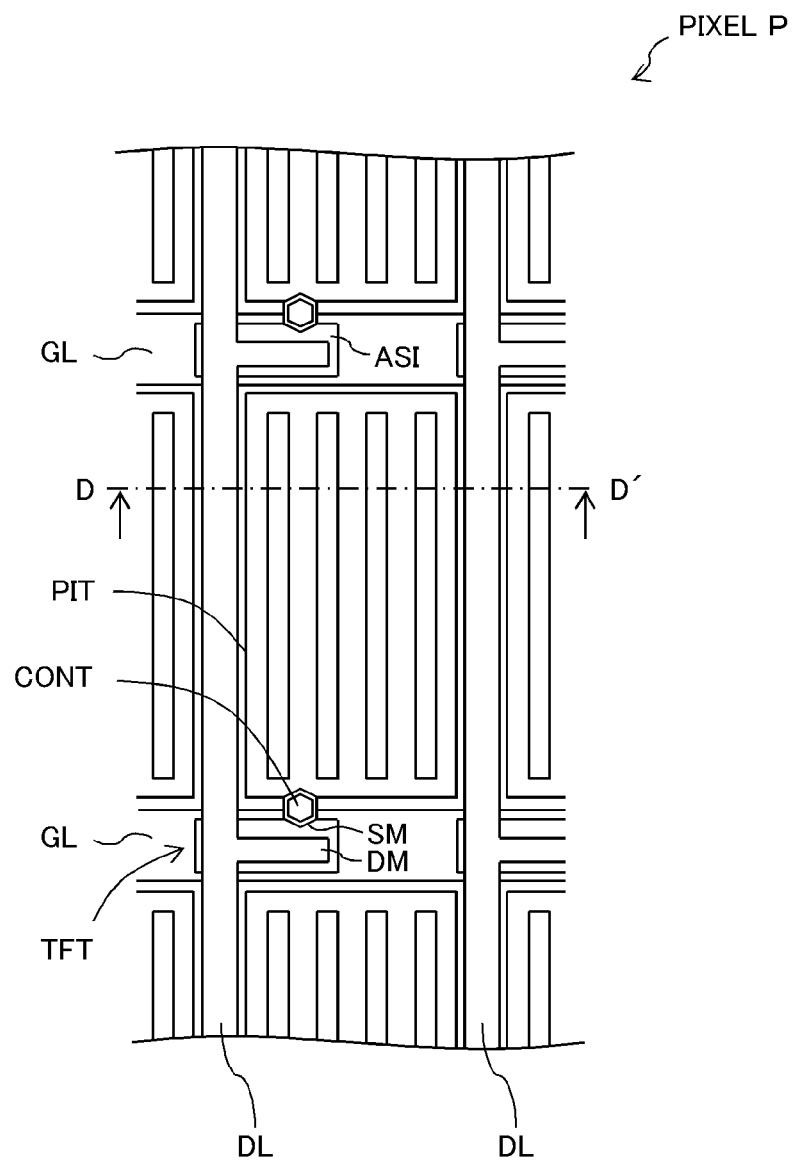
FIG. 8 is a plan view illustrating the configuration of a pixel.
Figure 9:
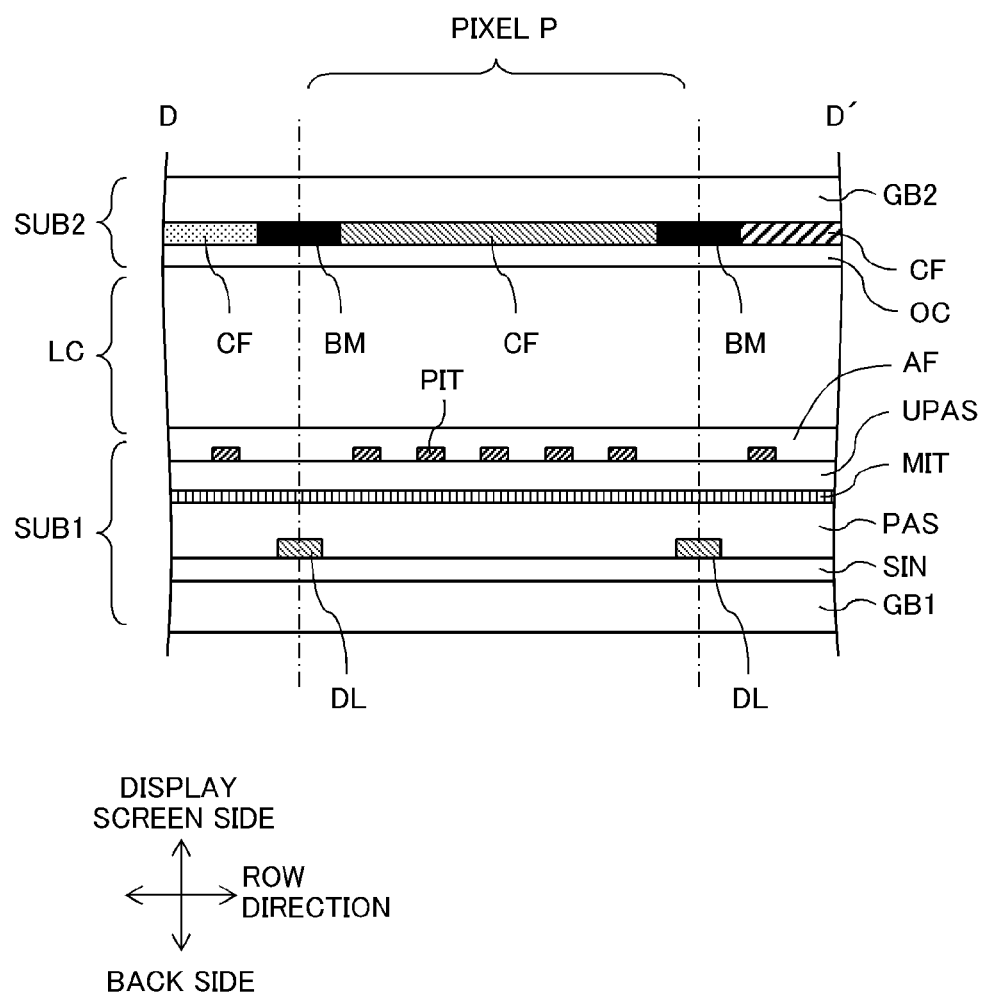
FIG. 9 is a cross-sectional view taken along a line D-D of FIG. 8.

Next, a description will be given of the specific configuration of a pixel area in the image display area DIA. FIG. 8 is a plan view illustrating a constitutional example of a pixel P; and FIG. 9 is a cross-sectional view taken along a line D-D of FIG. 8. As shown in FIG. 9, the pixel P includes a thin film transistor substrate SUB1 (hereinafter referred to as a TFT substrate) (i.e., a first substrate) arranged on the back side, a color filter substrate SUB2 (hereinafter referred to as a CF substrate) (i.e., a second substrate) that is disposed opposite to the TFT substrate SUB1 and arranged on the side of a display screen, and a liquid crystal layer LC held between the TFT substrate SUB1 and the CF substrate SUB2. In FIG. 8, the TFT substrate SUB1 is viewed from the side of a display screen through the CF substrate SUB2 for the sake of convenience.

On the TFT substrate SUB1, the plurality of data lines DL extending in the column direction and the plurality of gate lines GL extending in the row direction are formed. The thin film transistors TFT are formed in the vicinity of the intersections between each of the plurality of data lines DL and each of the plurality of gate lines GL.

In the pixel P, a pixel electrode PIT consisted of a transparent conductive film made of indium tin oxide (ITO) or the like is formed. As shown in FIG. 8, the pixel electrode PIT has openings (e.g., slits) within the pixel area, and therefore, is formed into a stripe shape. In the thin film transistor TFT, the semiconductor layer ASI is formed on the insulating film SIN (see FIG. 9), and further, a drain electrode DM and a source electrode SM are formed on the semiconductor layer ASI (see FIG. 8). The drain electrode DM is electrically connected to the data line DL: the source electrode SM is electrically connected to the pixel electrode PIT via a contact hole CONT. Moreover, a common electrode MIT (see FIG. 9) common to the pixels P is solidly formed over the entire image display area DIA.

As shown in FIG. 9, in the TFT substrate SUB1, the gate lines GL (not shown) are formed on the glass substrate GB1, and further, the insulating film SIN is formed in such a manner as to cover the gate lines GL. Moreover, the data lines DL are formed on the insulating film SIN, and further, the insulating film PAS is formed in such a manner as to cover the data lines DL. The common electrode MIT is formed on the insulating film PAS, and further, the insulating film UPAS is formed in such a manner as to cover the common electrode MIT. Additionally, the pixel electrodes PIT are formed on the insulating film UPAS, and further, an orientation film AF is formed in such a manner as to cover the pixel electrodes PIT. Other than that, a polarizing plate and the like are formed in the TFT substrate SUB1, although not shown. The laminate structure of the component parts constituting the pixel P is not limited to the configuration shown in FIG. 9. For example, a well-known configuration is applicable.

As illustrated in FIG. 2, the common electrode MIT is connected to the common wiring CML in the frame region. In this manner, a common voltage (Vcom) output from the common voltage generating circuit CMD is supplied to the common electrode MIT via the common wiring CML. Moreover, the common electrode MIT, and the common wiring CML and the control line CL1 that are connected to the common voltage generating circuit CMD are made of the same material in the same layer. As a consequence, the common electrode MIT, the common wiring CML, and the control line CL1 can be formed in the same process. Here, the common electrode MIT, and the common wiring CML and the control line CL1 that are connected to the common voltage generating circuit CMD may be formed on layers different from each other.

In the CF substrate SUB2, a black matrix BM and colored portions CF (e.g., a red portion, a green portion, and a blue portion) are formed on the glass substrate GB2, and further, an overcoat layer OC is formed in such a manner as to cover them. Other than that, an orientation film, a polarizing plate, and the like are formed in the CF substrate SUB2, although not shown.

With the configuration shown in FIGS. 8 and 9, the liquid crystal display device LCD has a configuration of a so-called IPS (i.e., In Plane Switching) system. Here, the configuration of the pixel in the IPS system is not limited to the configuration shown in FIGS. 8 and 9.

Subsequently, explanation will be made on halftone exposing included in the fabricating method for the thin film transistors TFT1 and TFT2 constituting the protection circuit PC. FIG. 10A to FIG. 10F are views schematically illustrating a part of the method for fabricating the thin film transistors TFT1 and TFT2, respectively. In the explanation, the relay wiring TL is regarded as a source/drain layer SD.

Figure 10A:
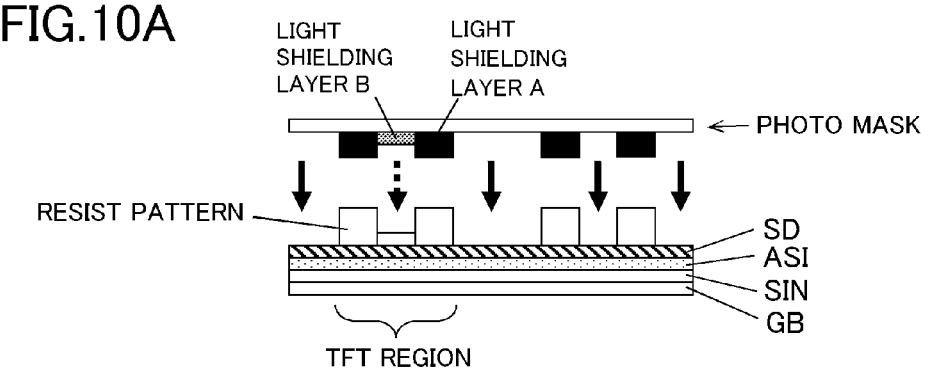
FIG. 10A to FIG. 10F are views schematically illustrating a part of a fabricating method for a thin film transistor, respectively.
Figure 10B:
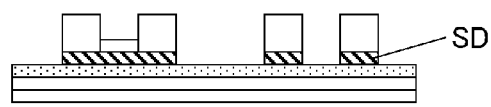
Figure 10C:
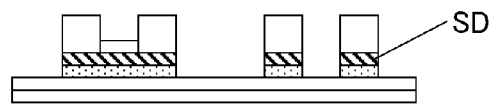
Figure 10D:
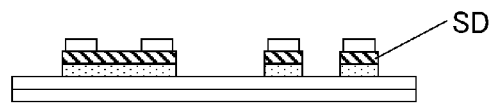
Figure 10E:
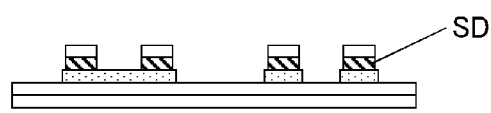
Figure 10F:
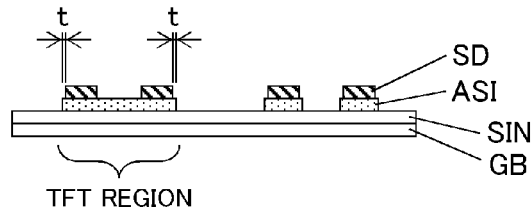

First, the semiconductor layer ASI and the source/drain layer SD are formed in order on the insulating film SIN formed on the glass substrate GB. Thereafter, a resist film formed on the source/drain layer SD is exposed to light with a photo mask having light shielding layers A and B, thus forming a resist pattern (FIG. 10A). The exposure amount (i.e., the transparent amount) of the light shielding layer A is set to be smaller than that of the light shielding layer B. Consequently, a resist film corresponding to the light shielding layer B is thinner than a resist film corresponding to the light shielding layer A at the exposed resist pattern. Next, the source/drain layer SD and the semiconductor layer ASI are etched in order with respect to the resist pattern (FIG. 10B and FIG. 10C). And then, the resist pattern is asked, and thus, the resist pattern corresponding to the light shielding layer B is removed (FIG. 10D). Thereafter, the source/drain layer SD is etched with respect to the remaining resist (FIG. 10E). In the end, the remaining resist is peeled off (FIG. 10F).

With the above-described fabricating method by the halftone exposure, it is possible to reduce the number of masks and the number of processes of photo etching, thus simplifying the fabricating processes, in comparison with a conventional thin film transistor fabricating method.

Although the metal wiring GAL formed on the gate layer is used as the connection wiring CDL1 connected to the data driver IC in the present preferred embodiment, the use of the source/drain layer SD same as the data line DL may be conceived in consideration of the layer structure. However, using the source/drain layer SD as the connection wiring CDL1 possibly raises the following problems.

With the above-described fabricating method by the halftone exposure, the profile (width) of the semiconductor layer ASI is greater than that of the source/drain layer SD. In other words, the end of the source/drain layer SD is located inward of the end of the semiconductor layer ASI by a width t, as illustrated in FIG. 10F. Consequently, in the case where the source/drain layer SD is used as the connection wiring CDL1, the semiconductor layer ASI under the source/drain layer SD is brought into contact with the adjacent semiconductor layer ASI particularly at an inclined wiring portion near the data driver IC (see FIG. 4), thereby raising a fear of unfavorable displaying.

Such a problem in this point cannot arise in the present preferred embodiment since the connection wiring CDL1 is formed on the gate layer. Thus, the above-described fabricating method by the halftone exposure is preferred in the present preferred embodiment.

Moreover, the control line CL1 for the thin film transistors TFT1 and TFT2 constituting the protection circuit PC is formed in the same layer as the common electrode MIT and the common wiring CML in the present preferred embodiment. As a consequence, there is no possibility that the control line CL1 is brought into contact with the wirings formed on the gate layer and the source/drain layer (i.e., the connection wiring CDL and the data line DL). Thus, as illustrated by way of the present preferred embodiment (see FIG. 2), the protection circuits PC can be arranged in the zigzag fashion. Specifically, in the case where, for example, the control line CL1 is formed on the gate layer, the control line CL1 disposed in the lower side of the drawing is brought into contact with the connection wirings CDL2 and CDL4 on the gate layer, as is obvious from FIG. 2. Further, in the case where, for example, the control line CL1 is formed on the source/drain layer, the control line CL1 disposed in the upper side of the drawing is brought into contact with the data lines DL1 and DL3 on the source/drain layer, as is obvious from FIG. 2. In this point, the control line CL1 cannot be brought into contact with each of the connection wirings CDL or each of the data lines DL since the control line CL1 is formed in the same layer as the common electrode MIT and the common wiring CML in the present preferred embodiment.

Additionally, since a layer converting region for connecting the connection wiring CDL and the data line DL to each other is formed in the thin film transistor TFT formation region inside of the protection circuit PC in the present preferred embodiment, no layer converting region needs to be separately formed. Thus, the area of the frame region can be reduced.

Although, the protection circuit PC on the side of the data line driving circuit DD has been described above, the above configuration of the protection circuit PC is applicable to a protection circuit on the side of the gate line driving circuit GD in the same manner.

Figure 11:
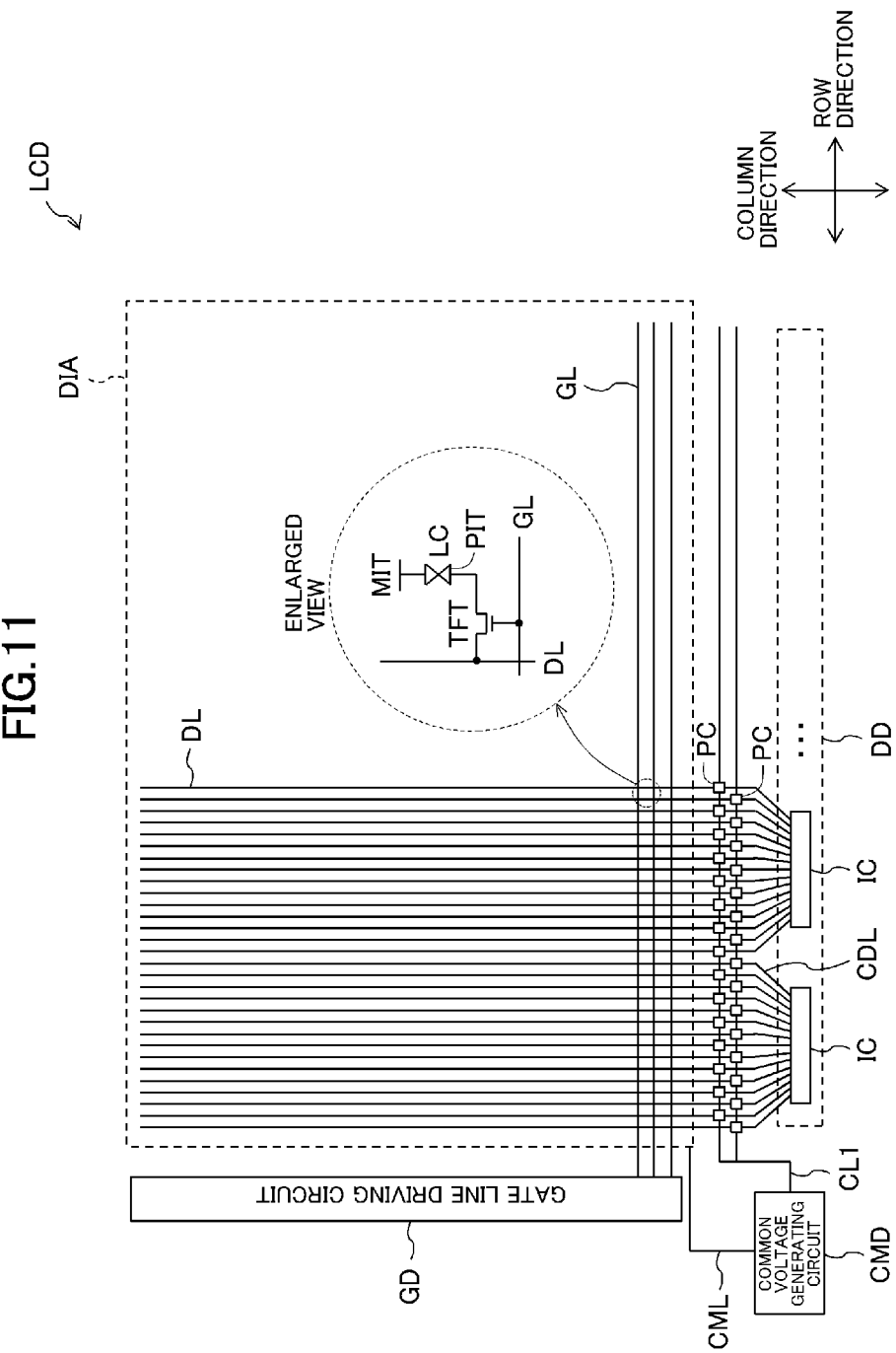
FIG. 11 is a diagram illustrating the entire configuration of another liquid crystal display device in a preferred embodiment according to the present invention.
Figure 12:
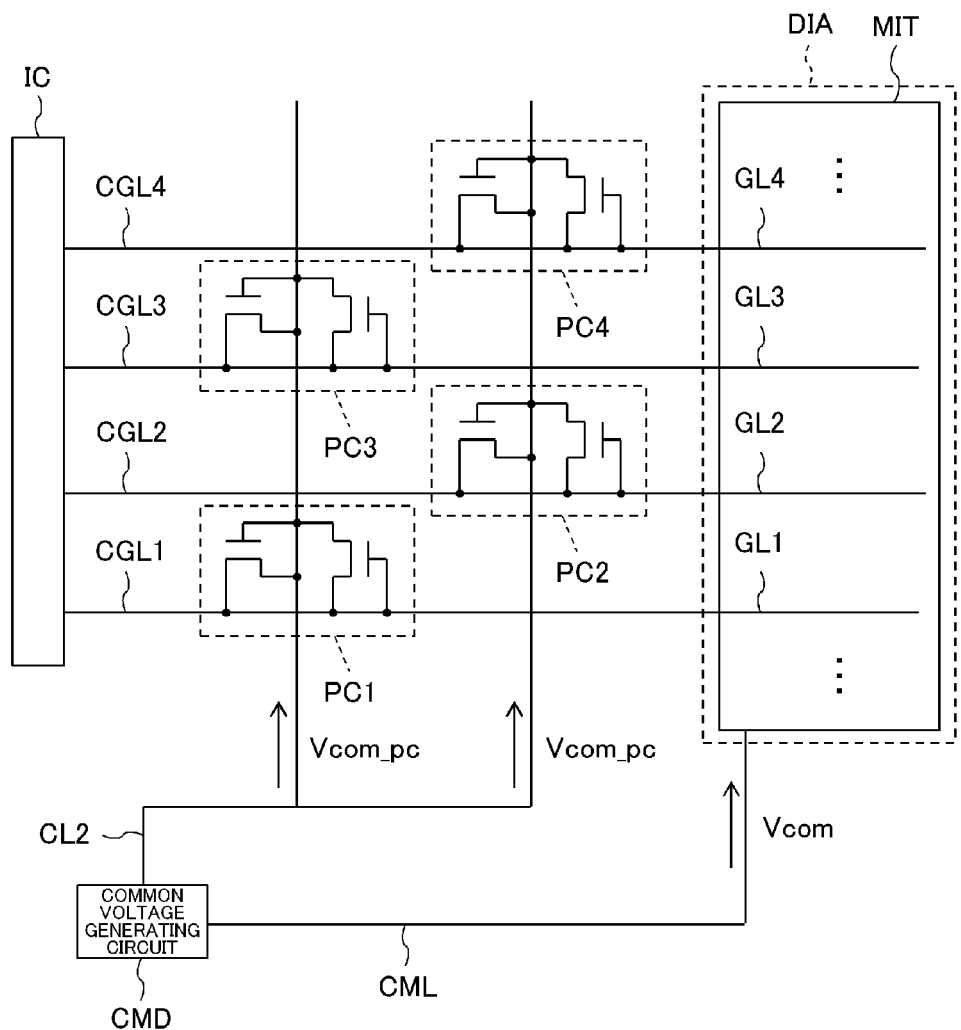
FIG. 12 is a diagram illustrating the connection relationship between protection circuits and a data driver IC.

FIG. 11 is a diagram illustrating the entire configuration of another liquid crystal display device LCD in a preferred embodiment according to the present invention. As illustrated in FIG. 11, one end of a connection wiring CGL is connected to an output terminal of a gate driver IC; the other end of the connection wiring CGL is connected to a protection circuit PC; and one end of a gate line GL is connected to the protection circuit PC. Each of the connection wirings CGL is formed in a source/drain layer whereas each of the gate lines GL is formed in a gate layer. The connection wiring CGL and the gate line GL are electrically connected to each other inside of the protection circuit PC via the protection circuit PC. One protection circuit PC is provided for one gate line GL. FIG. 12 is a diagram illustrating the connection relationship between protection circuits PC and a data driver IC. Here, a protection circuit PC on the side of a data line driving circuit DD (see FIG. 2) is omitted in FIG. 12 for the sake of convenience. For example, a protection circuit PC1 is provided for a connection wiring CGL1 and a gate line GL1 whereas a protection circuit PC2 is provided for a connection wiring CGL2 and a gate line GL2.

To a common voltage generating circuit CMD, a control line CL2 is connected for supplying a constant voltage (Vcom_pc in FIG. 12) to each of the protection circuits PC. The control line CL2 extends in a column direction in such a manner as to be perpendicular to the gate line GL, as viewed on the plane. The common voltage generating circuit CMD is adapted to supply the same voltage (Vcom) to a common wiring CML and the control line CL2.

The configuration of the protection circuit PC is identical to that on the side of a data line driving circuit DD (see FIG. 3).

Figure 13:
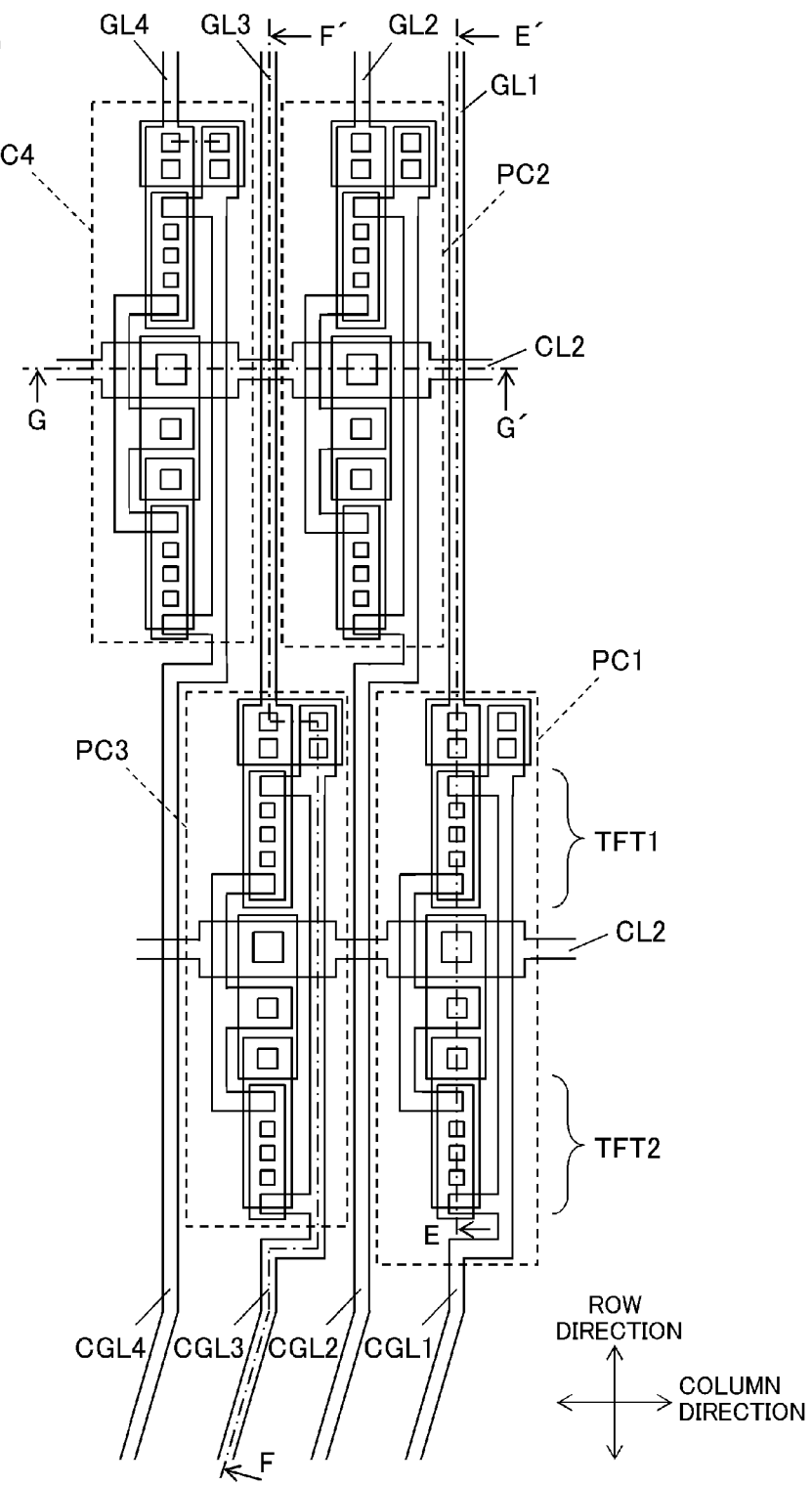
FIG. 13 is a plan view illustrating the connection relationship between wirings inside of the protection circuits.
Figure 14:
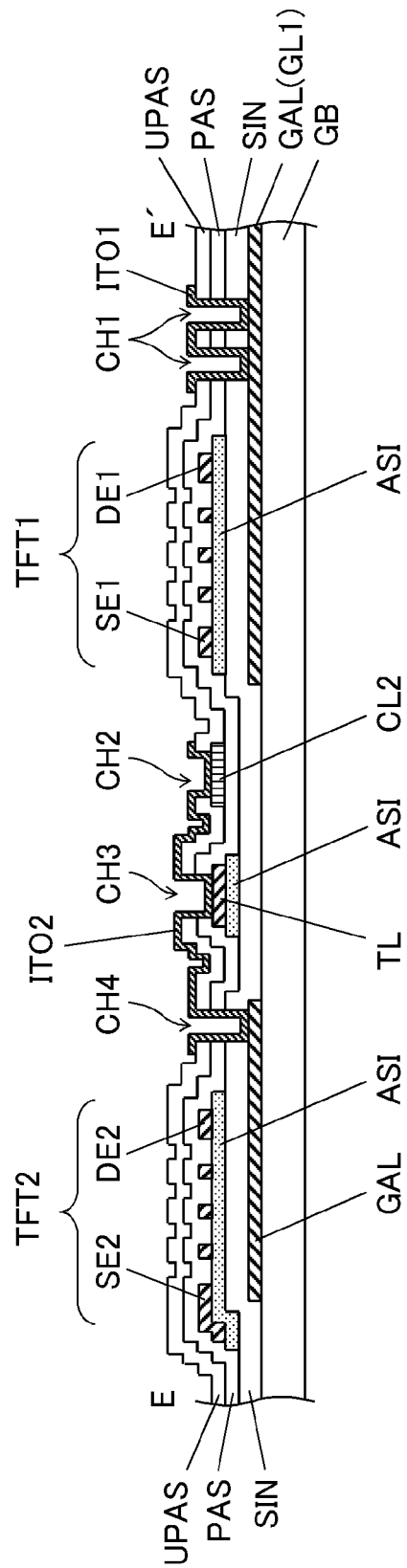
FIG. 14 is a cross-sectional view taken along a line E-E of FIG. 13.
Figure 15:
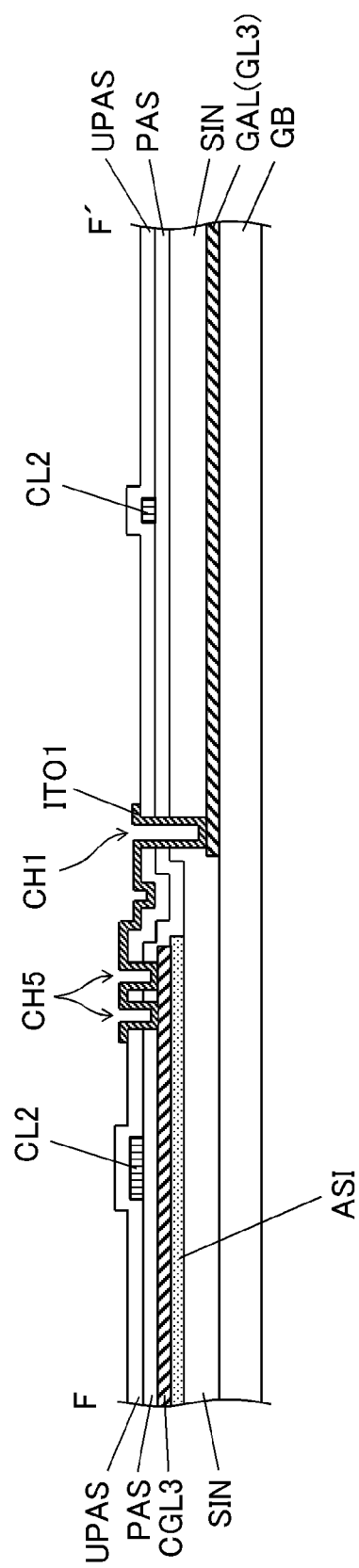
FIG. 15 is a cross-sectional view taken along a line F-F of FIG. 13.
Figure 16:
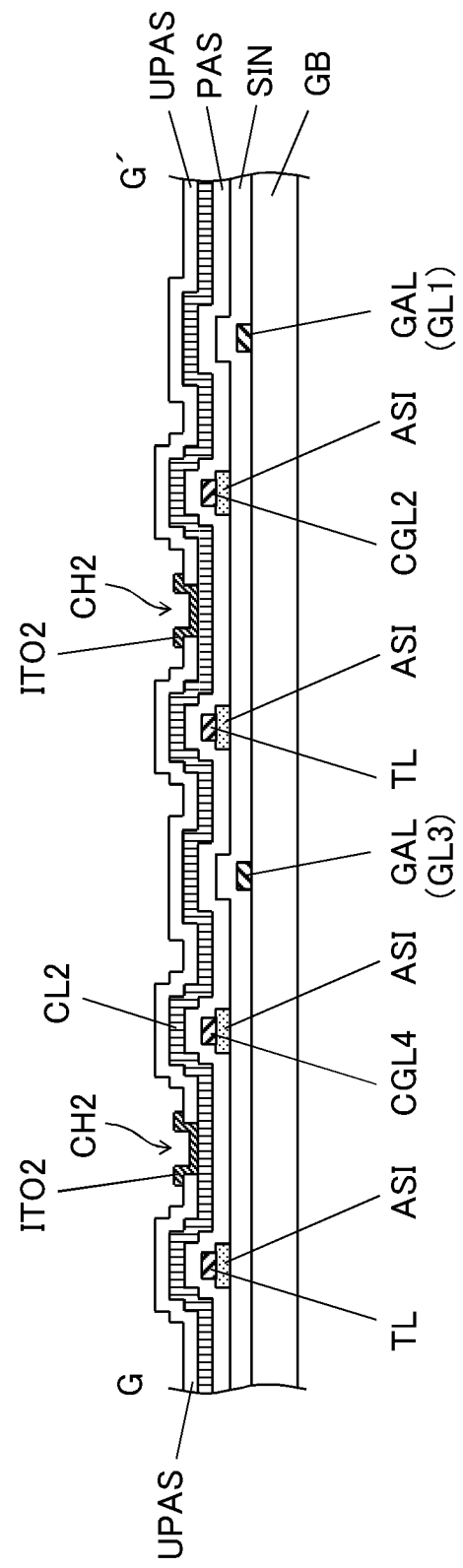
FIG. 16 is a cross-sectional view taken along a line G-G of FIG. 13.

FIG. 13 is a plan view illustrating the connection relationship between wirings inside of the protection circuits PC. FIG. 14 is a cross-sectional view taken along a line E-E in FIG. 13; FIG. 15 is a cross-sectional view taken along a line F-F in FIG. 13; and FIG. 16 is a cross-sectional view taken along a line G-G in FIG. 13. Here, members having the same functions as those illustrated in the protection circuit PC on the side of the data line driving circuit DD (FIGS. 4 to 7) are designated by the same reference numerals, and therefore, their explanation will be omitted below. Hereinafter, explanation will be made byway of a protection circuit PC1. Here, FIG. 15 illustrates the cross-sectional configuration of a protection circuit PC3 for the sake of convenience.

The connection wiring CGL1 extends slantwise near the data driver IC, and then, extends in the row direction near the protection circuit PC1. As illustrated in FIG. 15, the connection wiring CGL3 is formed in a source/drain layer, and is electrically connected to a gate line GL3 (a metal wiring GAL) formed in a gate layer via a metal film ITO1 formed in contact holes CH1 and CH5 inside of the protection circuit PC3. The configurations of each of thin film transistors TFT1 and TFT2 illustrated in FIG. 14 are identical to that of each of the thin film transistors TFT1 and TFT2 in the protection circuit PC on the side of the data line driving circuit DD. Moreover, the configuration of the control line CL2 illustrated in FIG. 16 is identical to that of the control line CL1 for the protection circuit PC on the side of the data line driving circuit DD (see FIG. 7).

With the above-described configuration, like the effects produced by the above-described configuration of the protection circuit PC on the side of the data line driving circuit DD, it is possible to prevent an electrostatic discharge damage to the thin film transistor TFT within a pixel area, and further, to reduce the area of a frame.

Figure 17:
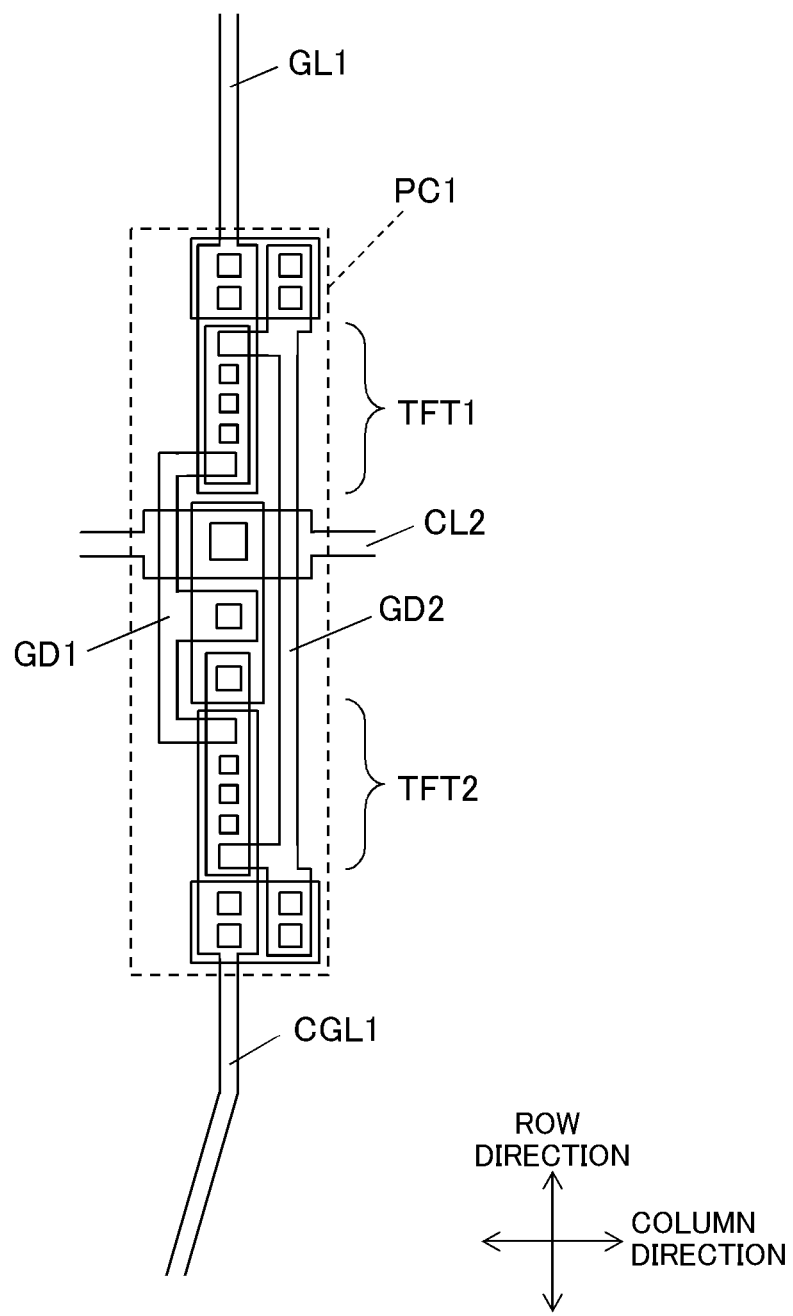
FIG. 17 is a plan view illustrating the connection relationship between wirings inside of the protection circuit.

Incidentally, the present invention is not limited to the above-described preferred embodiments. In, for example, the protection circuit PC on the side of the gate line driving circuit, a connection wiring CGL may be formed in a gate layer. In this case, as illustrated in FIG. 17, the connection wiring CGL and a gate line GL may be electrically connected to each other via a relay wiring GD2 formed in a source/drain layer. Alternatively, in the case where the connection wirings CGL are alternately formed in the source/drain layer and the gate layer at a narrow interval of a connection wiring CGL in, for example, a slantwise wiring region, the connection wiring CGL formed in the source/drain layer may be configured as illustrated in FIG. 13 whereas the connection wiring CGL formed in the gate layer may be configured as illustrated in FIG. 17.

With the configuration of the display device in the present preferred embodiment, it is possible to prevent an electrostatic discharge damage to the thin film transistor inside of a pixel area, and further, to reduce the area of a frame.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a first substrate on a back side; and
a second substrate on a display screen side,
the first substrate and the second substrate being disposed opposite to each other,
the first substrate comprising:
a plurality of gate lines, each of which extends in a row direction;
a plurality of data lines, each of which extends in a column direction;
a plurality of pixel electrodes arranged in a manner corresponding to a plurality of pixels arrayed in the column and row directions;
a common electrode disposed opposite to the plurality of pixel electrodes, for supplying a common voltage;
a plurality of thin film transistors arranged in the vicinity of intersections between the plurality of data lines and the plurality of gate lines;
a plurality of connection wirings that correspond to the plurality of data lines and are connected to a data line driving circuit;
a plurality of protection circuits that correspond to the plurality of data lines, respectively, and are adapted to protect the plurality of thin film transistors; and
a control line connected to the plurality of protection circuits, wherein
the plurality of data lines are electrically connected to the plurality of connection wirings via the plurality of protection circuits, respectively;
the plurality of connection wirings are formed in the same layer as the plurality of gate lines; and
the control line is formed of the same material as that of the common electrode and receiving the common voltage,
wherein each of the plurality of protection circuits includes first and second thin film transistors of a diode connection type;
in the first thin film transistor, a gate electrode is connected to the data line and the connection wiring, a drain electrode is connected to the data line and the connection wiring, and a source electrode is connected to the control line; and
in the second thin film transistor, a gate electrode is connected to the control line, a drain electrode is connected to the control line, and a source electrode is connected to the data line and the connection wiring,
wherein in the first substrate, a metal wiring constituting the gate line, the gate electrode for the first thin film transistor, and the gate electrode for the second thin film transistor is formed on a glass substrate; a first insulating film is formed in such a manner as to cover the metal wiring; a semiconductor layer is formed on the first insulating film;
the data line and a drawing wiring drawn from the data line are formed on the semiconductor layer; a second insulating film is formed in such a manner as to cover the data line and the drawing wiring; the control line and the common electrode are formed on the second insulating film; a third insulating film is formed in such a manner as to cover the control line and the common electrode; and the pixel electrode is formed on the third insulating film,
wherein a first contact hole reaching the control line is formed in the third insulating film; a second contact hole reaching the metal wiring constituting the gate electrode for the second thin film transistor is formed in the first insulating film, the second insulating film and the third insulating film; a metal film continuous to the inside of the first and second contact holes is formed; and
wherein the control line and the metal wiring are electrically connected to each other via the metal film.

2. The display device according to claim 1, wherein the control line is commonly provided in the first thin film transistor and the second thin film transistor in each of the plurality of protection circuits.

3. The display device according to claim 1, further comprising a common voltage generating circuit for supplying the common voltage to the common electrode,
the control line is electrically connected to the common voltage generating circuit.

4. The display device according to claim 1, wherein the plurality of protection circuits are arranged in a zigzag fashion outside of an image display area, as viewed on the plane.

5. The display device according to claim 1, wherein the plurality of data lines and the plurality of connection wirings that are formed on layers different from each other are electrically connected via a metal film forming a contact hole.

6. The display device according to claim 1, wherein the width of the semiconductor layer is greater than that of the data line and that of the drawing wiring.

* * * * *